Dec. 23, 1958

W. J. ZENNER 2,865,993

APPARATUS FOR RECORDING AND REPRODUCING TELEGRAPH SIGNALS

Filed March 30, 1955

INVENTOR
WALTER J. ZENNER
BY Emery Robinson
ATTORNEY

United States Patent Office 2,865,993
Patented Dec. 23, 1958

2,865,993

APPARATUS FOR RECORDING AND REPRODUCING TELEGRAPH SIGNALS

Walter J. Zenner, Des Plaines, Ill., assignor to Teletype Corporation, Chicago, Ill., a corporation of Delaware Application March 30, 1955, Serial No. 497,870

7 Claims. (Cl. 178—17)

Figure 1:
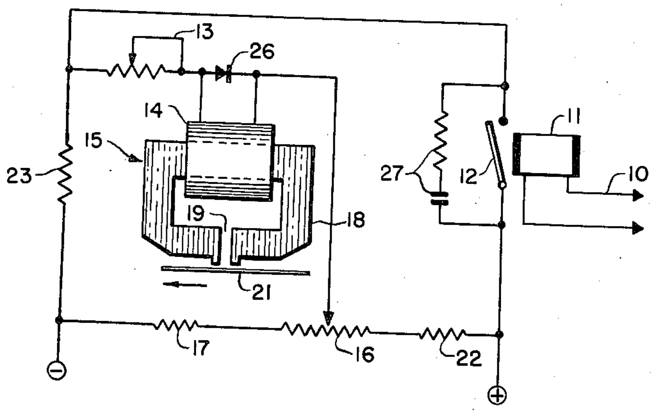

This invention relates to apparatus for recording and reproducing telegraph signals and more particularly to apparatus adaptable to the recordation of start-stop telegraph signals in a magnetizable medium together with facilities for detecting, amplifying and reproducing said signals from the magnetized medium.

In the printing telegraph art many diverse expedients have been devised for storing signals; for example, perforated tape, displaceable spheroids, magnetized tape or wire, selectively positionable mechanical elements, etc. However, the use of perforated tape has become more or less standardized, due to the ease with which the original signals can be reproduced therefrom. Use of perforated tape presumes an adequate supply of blank tape, ample storage places for both the blank and perforated tape and means for the disposal of the used tape. Often times these facilities are not readily available, particularly in the situation where the telegraph equipment consists of a mobile installation wherein space requirements are of a prime consideration. Magnetized tape provides a suitable storage means for this type of installation since the tape may be reused many times. Further, a great number of signals may be stored in a relatively short length of tape; thus, the storage problems are eliminated for both the blank and used tape. Even in view of these inherent advantages, the use of magnetized tape has not found wide acceptance due to the lack of adequate simple devices for faithfully reproducing the signals stored in the magnetized tape.

It is a primary object of this invention to provide an improved apparatus for accurately reproducing telegraph signals stored in a magnetized medium.

Further, the invention contemplates an improved differential relay arrangement acuatable in accordance with signal conditions impressed on a variable resistance element.

A more particular object of the invention is the provision of a signal pickup apparatus which responds to transitions in signal energy levels to generate impulses which control an output means to change the signal condition impressed on a transmission line.

With these and other objects in view the present invention contemplates the use of a recording device comprising a recording head in which current is passed therethrough in directions corresponding to signal impulses received from either a local or distant signal generator. A tape or wire having good magnetic flux conduction properties is passed beneath the recording head and the molecules therein are aligned in accordance with the magnetic field set up by the recording head. The molecules in the tape may be considered the same as small permanent magnets and when the tape is in an unmagnetized state these small magnets point in random directions and the net magnetic effect is zero. When the current flowing through the recording head is in accordance with one signal condition, the small permanent magnets will align themselves in the magnetic field to add their magnetic fields to the flux that is produced by the recording head. When the current is reversed in the recording head, the magnets will align themselves in a reverse direction; thus it may be appreciated that the tape is magnetized in accordance with the received signal conditions.

When it is desired to reproduce the signals stored in the tape, the tape is passed in close proximity to a pickup device comprising a core having a coil wound therearound. Each time a transition in the direction of alignment of the small permanent magnets is presented to the core, an instantaneous current impulse will be generated within the coil of the pickup device. This impulse is thereupon amplified through one or more steps and applied to a vacuum tube which is connected in one leg of a differential relay arrangement. Two relay coils comprise the differential arrangement and are adapted to control the positionment of a contact contained in an output transmission line. When the transition sensed by the pickup device is in one direction, a positive impulse is generated to decrease the resistance value of the vacuum tube and thereby energize a first one of the relay coils to move the contact into a position to impress a marking condition on the transmission line. When a second transition is sensed by the pickup head, a negative impulse is generated and applied to the vacuum tube whereupon said vacuum tube increases the resistance of one leg of the differential circuit to allow the second relay coil to assume control of the contact thereby impressing a second or spacing condition on the outgoing transmission line.

Figure 2:
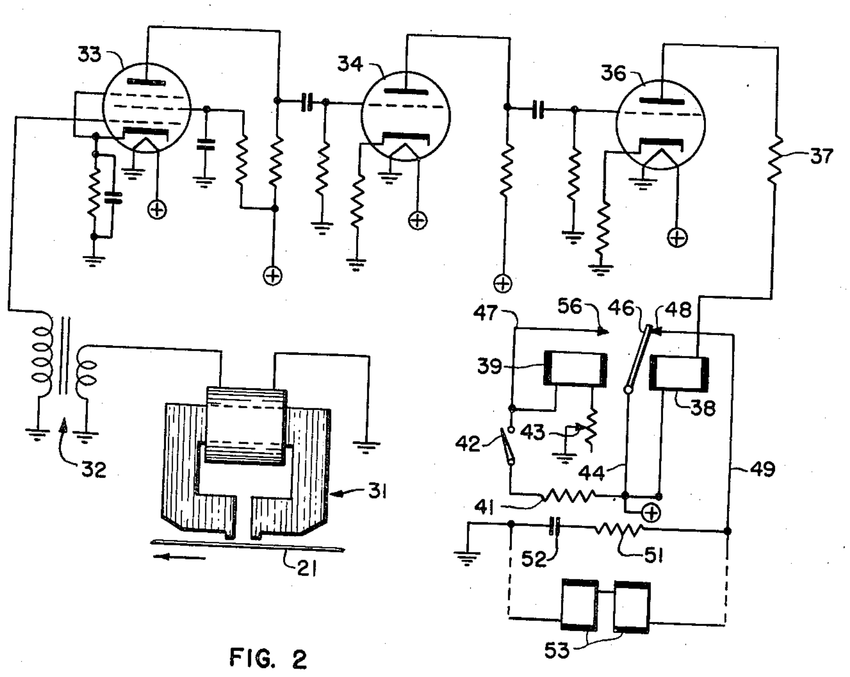

Other objects and advantages of the present invention will be apparent from the following detailed description when considered in conjunction with the accompanying drawing wherein:

Fig. 1 is a circuit diagram showing a device for recording telegraph signals in a magnetized tape; and Fig. 2 is a circuit diagram showing a device embodying the principal features of the invention for sensing signals impressed in a tape and adapted to reproduce said signals.

Referring to Fig. 1, a transmission line 10 is adapted to receive telegraph signals from a local or distant signal generator (not shown). When a so called marking or current condition is impressed on the line 10, a relay 11 included in the line is thereby energized to close an associated contact 12. Closure of the contact 12 is followed by a completion of an energizing circuit which may be traced from positive battery through the now closed contact 12, through an adjustable potentiometer 13, through the windings 14 of a recording head 15, through a potentiometer 16, through a resistance 17 to negative battery. The coil 14 is provided with a core 18 which forms a portion of a magnetic circuit having a very small air gap 19 through which the lines of magnetic flux are passed. Suitable means are provided to advance a demagnetized paramagnetic tape 21 in close proximity to the air gap 19 whereby the magnetic lines of flux may be diverted through the tape to align the molecules therein in accordance with the magnetic lines of force of the field set up by the coil 14.

When the current is interrupted in the line 10, a spacing condition is impressed therein to de-energize the relay 11 to release the contact 12 whereupon a circuit is then completed from positive battery through a fixed resistance 22, through the potentiometer 16, through the coil 14, through the potentiometer 13, through a fixed resistance 23 to negative battery. It may be thus appreciated that the current flowing through the windings 14 is now reversed and consequently the flux lines through the core 18 are likewise reversed. As the tape 21 now passes in the vicinity of the air gap 19 the molecules therein will be oriented in a direction opposite to that described in the preceding paragraph. Since the molecules in the tape are of infinitesimal size, the area of tape that needs to be magnetized to give an indication of the signaling condition on the line 10 is relatively small, hence great numbers of signals may be stored in relatively short lengths of tape.

Adjustable potentiometers 13 and 16 are provided in order that the amount of current flowing through the coil 14 is equal in situations when the contact 12 is either open or closed. A rectifier 26 is connected in parallel to the coil 14 to reduce transient effects caused by the interrupting current through the inductive recording head. The forward D. C. resistance of the rectifier 26 may be approximately 50 ohms while the resistance of the coil 14 may be 1 or 2 ohms. Consequently, the current that flows through the rectifier 26 when a marking condition is impressed on the line 10 is negligible. A resistance-capacitance combination 27 is connected across the contacts of the contactor 12 for the purpose of suppressing interference due to the opening and closing of the contact 12.

Attention is now directed to Fig. 2 wherein the tape, magnetized in accordance with signals, is passed by a playback head 31 causing voltages to be induced therein in accordance with the magnetic condition of the tape. Each transition in the magnetic condition of the tape results in the generation of a current impulse which induces a corresponding impulse in the secondary of a transformer 32. The impulse is thereupon applied to a first amplifier 33 to increase the magnitude of the impulse and thereafter said amplified impulse is again amplified by a secondary amplifier 34. The anode of the tube 34 is connected to the grid of a vacuum tube 36 to control the current which normally flows through this tube. Current flows through the tube 36 by means of a circuit which may be traced from ground to the cathode of the tube 36, through the tube, to the anode of the tube, through a resistance 37, through a first differential relay coil 38 to positive battery. It may be comprehended that as the potential on the grid of the tube 36 is increased (i. e., made more positive or less negative) the current flowing through the tube will correspondingly increase, thereby increasing the current flow through the relay coil 38 to increase the magnetic force produced. In a like manner when the potential on the grid of the tube 36 is decreased, the current flowing through the differential relay coil 38 correspondingly decreases to reduce the magnetic effect produced by the current flowing therethrough.

A second differential relay coil 39 is provided and has an energizing circuit which may be traced from positive battery through a relatively large fixed resistance 41, through a start switch 42 (when closed), through the relay coil 39, through a potentiometer 43 to ground. A shunt circuit for the resistance 41 is provided which may be traced from a junction point shown slightly above the source of positive potential, over a lead 44, through contactor 46, when attracted by the relay winding 39 into engagement with a contact 56, over a lead 47 and thence through the winding of the differential relay coil 39.

In the condition of the apparatus shown in Fig. 2, the contact 46 is shown abutting a fixed contact element 48 which is included in an outgoing transmission line 49. Transmission line 49 is provided with an interference suppression circuit consisting of a resistance 51 and capacitance 52 connected to ground. The transmission line 49 is shown running to an outlying station represented by a pair of selector magnets 53 of a printing telegraph receiving apparatus.

For the purposes of description of the operation of this portion of the invention assume that all sources of battery have been removed and that the switch 42 is open. Then upon application of positive battery to all sources, the tube 36 is passed into a conductive state and current will flow through the relay coil 38. Inasmuch as the switch 42 is open no current will flow through the relay coil 39, consequently the relay coil 38 will draw up the armature 46 into engagement with the stationary contact 48. Current will be thereupon impressed on the signaling line 49 which condition is indicative of a marking condition. The switch 42 is thereupon closed but due to the large resistance 41 included in the energizing circuit for the relay coil 39 the amount of current flowing to this relay coil is insufficient ot cause said relay coil to move the contactor 46 from engagement with the fixed contact 48.

Now as a tape having start-stop signals impressed thereon is advanced past the playback head 31, the sensing of a start condition which is a transition from one magnet condition to another causes the generation of an impulse which is negative with respect to ground potential and which is applied through the transformer 32 and from there is amplified by the tubes 33 and 34 to produce a negative impulse of sufficient magnitude to reduce the potential on the grid of the tube 36 to such an extent that the current flowing therethrough is decreased by several milliamperes. As previously indicated, the reduction of current flow through the tube 36 is accompanied by a decrease in magnetizing effect of the relay coil 38. This decrease in magnetizing affect is of such an extent that the magnetizing effect of the relay coil 39 controls the positionment of the contactor 46. Contactor 46 thereupon moves to the fixed or spacing contact 56 and the normal current impressed on the transmission line is interrupted to impress on said transmission line a space condition.

The impulse applied to the tube 36 is only of instantaneous duration and if some locking means were not provided for the relay coil 39, the relay coil 38 would again move the contactor 46 back into engagement with the marking contact 48. However, upon movement of the contactor 46 into engagement with the contact 56, the shunt circuit for the high resistance 41 is completed and the effectiveness of the relay coil 39 is maintained by a locking circuit which, as previously traced, runs from positive battery through the contactor 46, through the contact 56, over the lead 47, through the relay coil 39 to ground.

When a transition from a spacing to marking condition is sensed in the tape 21, the playback head will generate an impulse which is positive with respect to ground potential. The positive potential will be applied to the transformer 32 and from there it will be amplified by the amplifiers 33 and 34 whereupon the positive impulse will be applied to the grid of the tube 36 to increase the conductivity of this tube. Increased current flow through the tube 36 is accompanied by an increase in the magnetic effect of the relay coil 38 whereupon the contactor 46 will be moved from engagement with the spacing contact 56 into engagement with the marking contact 48. As soon as the contactor 46 moves from engagement with the contact 56, the locking circuit for the relay coil 39 is interrupted. The increased conductivity of the tube 36 is only of instantaneous duration, but it is of sufficient duration to permit the relay coil 38 to again assume control of the positionment of the contactor 46. Obviously these cycles of operation of the differential relay coils 38 and 39 will continue upon each sensing by the playback head 31 of a transition in the magnetic condition of the tape 21.

It is to be understood that the above-described arrangements of apparatus and circuits and constructions of elemental parts and components are simply illustrative of the application of the principles of the invention and many other modifications, changes and alternations may be made without departing from the invention.

What is claimed is:

1. In a device for reproducing signals stored as magnetized conditions in a magnetizable medium and applying them to a signal line, a pair of oppositely disposed relay coils, a movable contact and a fixed contact included in the signal line with the movable contact designed to be positioned by said coils, a first energizing circuit connected to a first of the coils for holding said coil energized and moving the movable contact into abutting relationship with the fixed contact, a second energizing circuit connected to the second of said coils, current-limiting means in said second circuit for precluding said second coil for moving said movable contact, a variable resistance element included in the energizing circuit for said first coil, means responsive to a change in magnetized condition in said magnetizable medium for causing said variable resistance to reduce the current flowing to said first coil whereby said second coil moves the movable contact out of abutting relationship with the fixed contact, and means connected to and operated by said movement of the movable contact for shunting said current-limiting means.

2. In an apparatus for reproducing signals stored as magnetized conditions in a storage medium, a signaling line including a switch, a first relay coil adapted to close the switch, a first energizing circuit including a normally-energized tube connected to said first coil, a second relay coil adapted to open said switch, a second energizing circuit connected to said second coil, a resistance included in said second energizing circuit for preventing said second coil from opening said switch when the tube operates in one conductive condition, and a sensing means adjacent to and responsive to a predetermined magnetized condition in the tape for changing said conductive condition of the tube whereby the second coil energizes and opens said switch.

3. In an apparatus as defined in claim 2, a normally-open shunt circuit connected across said resistance with said switch being connected in and designed to complete said shunt circuit upon being actuated by said second coil.

4. In an apparatus for reproducing signals stored as magnetized conditions in a storage medium, a signaling line including a switch in series therewith, a first relay coil designed to open the switch, a first energizing circuit connected to said first relay coil, a second relay coil designed to close said switch to complete the signaling line, a second energizing circuit including a tube connected to said second relay coil but being ineffective under certain conditions to supply sufficient current to cause the second relay coil to close said switch, and sensing means adjacent to the storage medium and responsive to a predetermined magnetized condition thereof for increasing the conductivity of the tube, whereby said second relay coil closes said switch and interrupts the first energizing circuit for said first relay.

5. In an apparatus for reproducing signals as defined in claim 4, a second energizing circuit for said first relay, and a high resistance included in said second energizing circuit for said first relay for reducing the current flow to said first relay when said first energizing circuit is interrupted.

6. In a signal reproducing device for impressing signals on a transmission line, an energizing switch in series with the transmission line, a pair of relay coils oppositely-disposed with respect to said switch, an energizing circuit connected to each of said coils, a high resistance connected in the circuit for energizing a first of said coils such that the other coil holds said switch closed in the transmission line, a shunt circuit including said switch connectable across said high resistance, a variable resistance device included in the energizing circuit for the second coil, a source of signal impulses, means responsive to a signal impulse and connected to the variable resistance for increasing said variable resistance, whereby the first coil moves the switch to open the transmission line and to close the shunt circuit.

7. In a device for reproducing signal impulses from a storage medium which is magnetized in either of two conditions, a transmission line, a movable contactor and a first fixed contact in said line, a first relay coil designed to place the movable contactor in abutting relationship with the first fixed contact, a first energizing circuit connected to the first coil and including an electronic tube for energizing the first coil to hold said movable contactor and said fixed contact together, a second relay coil, a second energizing circuit for said second relay coil, a resistance connected in the second energizing circuit for normally limiting the energization of the second coil whereby said first coil holds the contactor and the first fixed contact together, a shunt circuit connectable across said resistance including said movable contactor and a second fixed contact capable of being placed in abutting relationship with the movable contactor by the second coil, and sensing and amplifying means responsive to a transition in the magnetized condition of the medium for generating and applying to the tube a first voltage pulse of one polarity to reduce the conduction of the tube, whereupon said second relay coil moves the movable contactor and the second fixed contact together to complete the shunt circuit and hold the second coil energized, said sensing and amplifying means acting to generate a second voltage pulse of a polarity that is opposite to that of the first pulse upon ascertaining a second transition in the magnetized condition of the storage medium, whereupon said second pulse increases the conductivity of the tube to energize said second relay coil and close the movable contactor and the first fixed contact to energize the transmission line.

References Cited in the file of this patent

UNITED STATES PATENTS

| | | |
|---|---|---|
| 982,346 | Brown | Jan. 24, 1911 |
| 2,345,155 | Reagon | Mar. 28, 1944 |
| 2,456,463 | Starie | Dec. 14, 1948 |
| 2,480,386 | Sherwood | Aug. 30, 1949 |
| 2,516,167 | Wood | July 25, 1950 |
| 2,554,835 | Mallina | May 29, 1951 |
| 2,611,808 | Lawrence | Sept. 23, 1952 |